Patented Sept. 4, 1951

2,566,658

UNITED STATES PATENT OFFICE 2,566,658

SILVER HALIDE EMULSIONS CONTAINING ANTIFOGGING AGENTS

Douglas James Fry, Ilford, England, assignor to Ilford Limited, Ilford, England, a British company No Drawing. Application November 17, 1949, Serial No. 128,025. In Great Britain November 23, 1948

3 Claims. (Cl. 95—7)

This invention relates to light-sensitive materials and particularly to photographic materials comprising a light-sensitive gelatino silver halide emulsion.

It is well known that light-sensitive gelatino silver halide emulsions tend to yield, on development, a deposit of silver even in those areas which have not been exposed to light. This, more or less uniform, deposit is generally referred to as "chemical fog" and is disadvantageous in degrading the high-lights of the developed negative or print. The tendency to the formation of fog is increased on keeping the emulsion, so that photographic materials which have been stored for a long time, especially in humid conditions, generally show a high "fog" density. The tendency to the formation of fog is also increased by development at high temperature, e. g. in tropical conditions. Photographic gelatino silver-halide emulsions may be stabilised against the changes which give rise to fog, and the general level of fog may be reduced, by adding to the emulsions various organic compounds. Such additions, however, frequently adversely affect the other sensitometric characteristics of the emulsions, e. g. the speed and contrast characteristics of the emulsions.

According to the present invention gelatino silver halide photographic emulsions contain a small quantity of a compound of the general formula:

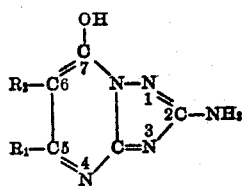

where $R_1$ is an alkyl, aryl or aralkyl group, an alicyclic or heterocyclic group or an amino, hydroxy or carbalkoxy group, and $R_2$ is a hydrogen atom or an alkyl, aralkyl, aryl, alicyclic or heterocyclic group, or $R_1$ and $R_2$ together form the residue of a ring linking the 5- and 6-positions. Such emulsions show a much reduced tendency to develop fog, but their sensitometric characteristics are otherwise very little affected by the added compounds.

Compounds of the foregoing general formula may be obtained by reacting 2:5-diamino-1:3:4-triazole (also known as guanazole) with a β-ketonic ester, a cyclic β-keto ester, or a malonic or cyanacetic ester. β-Ketonic esters yield variously substituted compounds according to the particular β-ketonic ester employed. A suitable β-ketonic ester is acetoacetic ester and a suitable cyclic β-keto ester is ethyl cyclohexanone 2-carboxylate. Cyclic β-keto esters produce substances in which $R_1$ and $R_2$ jointly form the residue of an alicyclic ring linking the 5- and 6-positions.

The general formula assigned to the products of these processes is believed to be correct and follows the general lines of the structure for other compounds of similar type referred to in Beilstein's Handbuch der Organische Chemie, volume XXVI, page 4117. However, it is to be understood that the compounds employed in the present invention are the compounds obtained by the processes outlined above whatever their chemical structure may ultimately prove to be.

The following are examples of the production of typical compounds for use in the present invention:

Example 1

1 gm. 2:5-diamino-1:3:4-triazole (1 mol.) is mixed with 1.3 gm. ethylacetoacetate (1 mol.) in 5 cc. glacial acetic acid and the mixture boiled. The reactants first dissolve, and the product then quickly separates. After one hour the mixture is cooled and the product isolated by filtration. It may be purified by crystallising from water. The melting point is above 290° C. Ethyl alcohol may be used as solvent in place of acetic acid and excess ethylacetoacetate up to a total of 5 mols. gives the same product.

This particular product is believed to have the formula:

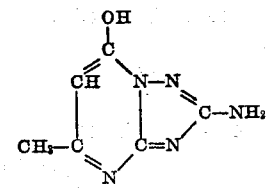

Example 2

5.0 gm. 2:5-diamino 1:3:4-triazole is mixed with 5.65 gm. ethyl cyanacetate in a solution of sodium ethoxide prepared by dissolving 1.12 gm. sodium in 25 cc. ethyl alcohol. The solution is boiled for 4 hours, cooled, acidified with hydrochloric acid and concentrated to isolate the product, M. Pt. 300° C.

This product is believed to have the formula:

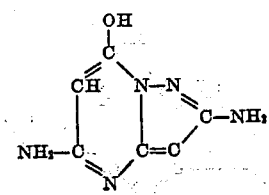

Example 3

1.0 gm. 2:5-diamino-1:3:4-triazole (1 mol.) is mixed with 1.6 g. diethyl malonate (1 mol.) in 5 cc. glacial acetic acid, and the whole heated under a reflux condenser for three hours; solid is precipitated during the heating. It is isolated by filtration and recrystallised from acetic acid. M. Pt. above 285° C.

This product is believed to have the formula:

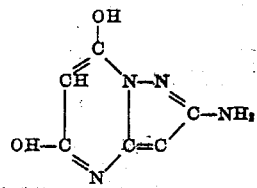

Example 4

2.0 gm. 2:5-diamino-1:3:4-triazole is mixed with 3.4 gm. ethyl cyclohexanone carboxylate in 15 cc. glacial acetic acid and the whole heated under a reflux condenser for one hour; solid precipitates almost immediately heating begins. After cooling it is collected and recrystallised from water, M. Pt. about 340°. The same compound is obtained when the two reactants are heated in an alcoholic solution of sodium ethoxide prepared from 0.46 gm. sodium and 15 cc. alcohol, followed by acidification to precipitate the product.

This compound is believed to have the formula:

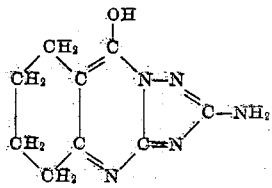

Example 5

This is prepared as in Example 1 by heating 1.0 gm. 2:5-diaminotriazole and 2.2 gm. ethyl benzylacetoacetate in 5.0 cc. glacial acetic acid. The product is precipitated during the heating period. After recrystallisation from water it melted above 295° C.

This compound is believed to have the formula:

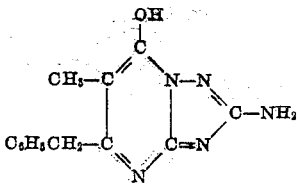

Example 6

Prepared as in Example 1 by heating 1.0 gm. 2:5-diaminotriazole and 1.8 gm. ethyl α-furoylacetate in 5.0 cc. glacial acetic acid. The product was recrystallised from aqueous acetic acid and melted above 305° C.

This compound is believed to have the formula:

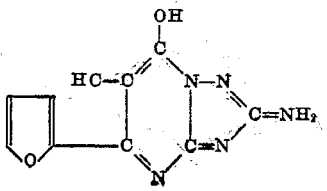

Example 7

Prepared as in Example 1 by heating 1.0 gm. 2:5-diaminotriazole and 1.85 gm. ethyl butylacetoacetate. After crystallisation from acetic acid the product melted above 305° C.

This compound is believed to have the formula:

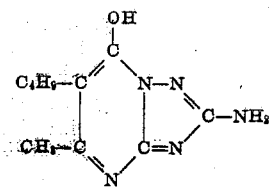

Example 8

1.0 gm. 2:5-diamino-1:3:4-triazole is mixed with 2.24 gm. ethyl cyclopentanone-2:5-dicarboxylate in 8 cc. glacial acetic acid and the mixture boiled for 1 hour. The product was collected and crystallised from glacial acetic acid and then melted at 305° C.

This compound is believed to have the formula:

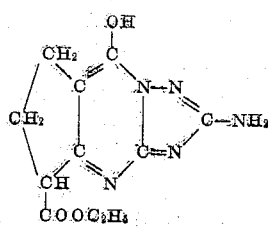

Only very small quantities of the compounds are necessary to stabilise the emulsions against the development of fog. For example a range of quantities of 0.02 g. to 1 g. for an emulsion containing 1½ g. mols. silver iodobromide is usually sufficient.

Thus, for example, 0.5 g. of the compounds obtained by the processes of Examples 1 and 4 were added (dissolved in water, dilute caustic soda or ethyl alcohol) to an emulsion containing 1½ g. mols. of silver iodobromide, and the emulsion was then coated on a support. A "control" coating was made with emulsion not containing the said compound. Specimens of the control and test emulsions were tested for fog density and speed after storage for 8 days under normal conditions (normal keeping). Further specimens were stored in a sealed container for 8 days at 120° F. The following table shows the results obtained:

|  | Normal Keeping | | 8 Days at 120° F. | |
| --- | --- | --- | --- | --- |
|  | Fog density | Relative log speed | Fog density | Relative log speed |
| Control | 0.04 | 3.69 | 0.12 | 3.80 |
| Example 1 | 0.04 | 3.61 | 0.02 | 3.85 |
| Control | 0.06 | 3.65 | 0.37 | 3.49 |
| Example 4 | 0.05 | 3.55 | 0.07 | 3.79 |

It will be seen that whereas the fog density of the control increased considerably on keeping at 120° F., that of the test specimens did not, and that the speed of the emulsion was not seriously affected.

The compounds of each of Examples 2, 3, 5, 6, 7 and 8 may be similarly employed with like effect.

What I claim is:

1. A photographic gelatino silver halide emulsion containing a small quantity of a compound of the general formula:

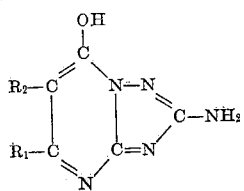

where $R_1$ is selected from the class consisting of alkyl, aryl, aralkyl, alicyclic, heterocyclic, amino, hydroxy and carbalkoxy groups, and $R_2$ is selected from the class consisting of the hydrogen atom and alkyl, aralkyl, aryl, alicyclic and heterocyclic groups and, together with $R_1$, a divalent group linking the carbon atoms to which $R_1$ and $R_2$ are attached.

2. A photographic gelatino silver halide emulsion containing a small quantity of a compound of the general formula:

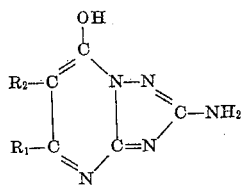

where $R_1$ is selected from the class consisting of alkyl, aryl, aralkyl, alicyclic, heterocyclic, amino, hydroxy and carbalkoxy groups, and $R_2$ is selected from the class consisting of the hydrogen atom and alkyl, aralkyl, aryl, alicyclic and heterocyclic groups and, together with $R_1$, a divalent group linking the carbon atoms to which $R_1$ and $R_2$ are attached, the quantity of such compound being between 0.02 g. to 1 g. per 1½ g. mols. silver halide in the emulsion.

3. A photographic gelatino silver iodobromide emulsion containing a small quantity of a compound of the general formula:

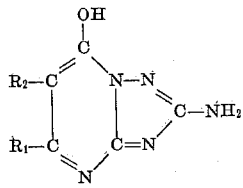

where $R_1$ is selected from the class consisting of alkyl, aryl, aralkyl, alicyclic, heterocyclic, amino, hydroxy and carbalkoxy groups, and $R_2$ is selected from the class consisting of the hydrogen atom and alkyl, aralkyl, aryl, alicyclic and heterocyclic groups and, together with $R_1$, a divalent group linking the carbon atoms to which $R_1$ and $R_2$ are attached, the quantity of such compound being between 0.02 g. to 1 g. per 1½ g. mols. silver iodobromide in the emulsion.

DOUGLAS JAMES FRY.

REFERENCES CITED

The following references are of record in the file of this patent:

UNITED STATES PATENTS

| Number | Name | Date |
|---|---|---|
| 2,449,225 | Heimbach et al. | Sept. 14, 1948 |
| 2,476,536 | Dersch | July 19, 1949 |